(12) United States Patent
Carroscia et al.

(10) Patent No.: US 8,313,054 B2
(45) Date of Patent: Nov. 20, 2012

(54) WIRE DISPENSING SYSTEM INCLUDING WIRE PAYOFF STRUCTURE

(75) Inventors: Michael Carroscia, Newbury, OH (US); Dennis Hartman, North Ridgeville, OH (US)

(73) Assignee: Lincoln Global, Inc., Cleveland, OH (US)

( * ) Notice: Subject to any disclaimer, the term of this patent is extended or adjusted under 35 U.S.C. 154(b) by 409 days.

(21) Appl. No.: 12/696,612

(22) Filed: Jan. 29, 2010

(65) Prior Publication Data

US 2011/0186677 A1    Aug. 4, 2011

(51) Int. Cl.
*B65H 59/02*    (2006.01)
(52) U.S. Cl. .................. 242/423.1; 242/128; 242/156.1
(58) Field of Classification Search .................. 242/156, 242/156.1, 156.2, 423.1, 566, 593, 128, 125.3, 242/172, 419, 157 R
See application file for complete search history.

(56) References Cited

U.S. PATENT DOCUMENTS

| | | | |
|---|---|---|---|
| 2,227,187 A | 12/1940 | Hanson | |
| 2,390,157 A | 12/1945 | Kramer | |
| 2,935,274 A | 5/1960 | Pearson | |
| 2,946,535 A | 7/1960 | Marion | |
| 3,053,410 A | 9/1962 | Eaddy | |
| 3,107,880 A * | 10/1963 | Lawlis | 242/129 |
| 3,218,002 A | 11/1965 | Derrickson | |
| 3,556,431 A | 1/1971 | Freitag | |
| 3,664,601 A | 5/1972 | Richardson, Jr. | |
| 3,863,861 A | 2/1975 | Bellasio | |
| 4,651,948 A * | 3/1987 | Delehouzee et al. | 242/129 |
| 4,657,204 A | 4/1987 | Colbert | |
| 4,763,854 A | 8/1988 | Borowski | |
| 4,942,692 A | 7/1990 | Colbert | |
| 5,169,086 A | 12/1992 | Vesely | |
| 6,655,627 B2 | 12/2003 | Patton | |
| 6,745,899 B1 | 6/2004 | Barton | |
| 7,367,452 B1 | 5/2008 | Hsu | |
| 7,410,111 B2 * | 8/2008 | Carroscia | 242/171 |
| 2004/0129332 A1 | 7/2004 | Wang et al. | |
| 2007/0295853 A1 * | 12/2007 | Cipriani | 242/423 |
| 2008/0110779 A1 | 5/2008 | Fabian | |

OTHER PUBLICATIONS

Wire payoff structure from ESAB Holdings Ltd. Known to be in the public domain prior to Jan. 29, 2009. Color photographs attached hereto as Exhibit A.
Wire payoff structure from ESAB Holdings Ltd. Known to be in the public domain prior to Jan. 29, 2009. Color photographs attached hereto as Exhibit B.
Wire payoff structure from ESAB Holdings Ltd. Known to be in the public domain prior to Jan. 29, 2009. Color photograph attached hereto as Exhibit C.
Wire payoff structure from National Standard. Known to be in the public domain prior to Jan. 29, 2009. Color photographs attached hereto as Exhibit D.

* cited by examiner

*Primary Examiner* — William A Rivera
(74) *Attorney, Agent, or Firm* — Ulmer & Berne LLP

(57) ABSTRACT

A wire payoff structure includes a plurality of arm members, a first ring, a second ring, and a third ring. The first ring is coupled with each of the arm members. The second ring is coupled with each of the arm members and is spaced radially outwardly from the first ring. The third ring is coupled with each of the arm members and is spaced radially outwardly from the second ring. A portion of each arm member passes beneath the third ring to facilitate contact with an underlying wire stack.

18 Claims, 4 Drawing Sheets

WIRE DISPENSING SYSTEM INCLUDING WIRE PAYOFF STRUCTURE

TECHNICAL FIELD

A wire dispensing system includes a wire payoff structure.

BACKGROUND

Certain conventional wire dispensing systems include a wire payoff structure and a wire container. A wire stack can be disposed within the wire container and the wire payoff structure can fit over top the wire stack to facilitate dispensation of a wire strand from the wire stack and out of the wire container. An intermediate structure, such as a cardboard ring, is provided between the wire payoff structure and the wire stack to prevent unraveling of the wire stack.

SUMMARY

In accordance with one embodiment, a wire payoff structure comprises a plurality of arm members, a first ring, a second ring, and a third ring. The first ring is coupled with each of the arm members. The second ring is coupled with each of the arm members and is spaced radially outwardly from the first ring. The third ring is coupled with each of the arm members and is spaced radially outwardly from the second ring. A portion of each arm member passes beneath the third ring to facilitate contact with an underlying wire stack.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION

Figure 1:
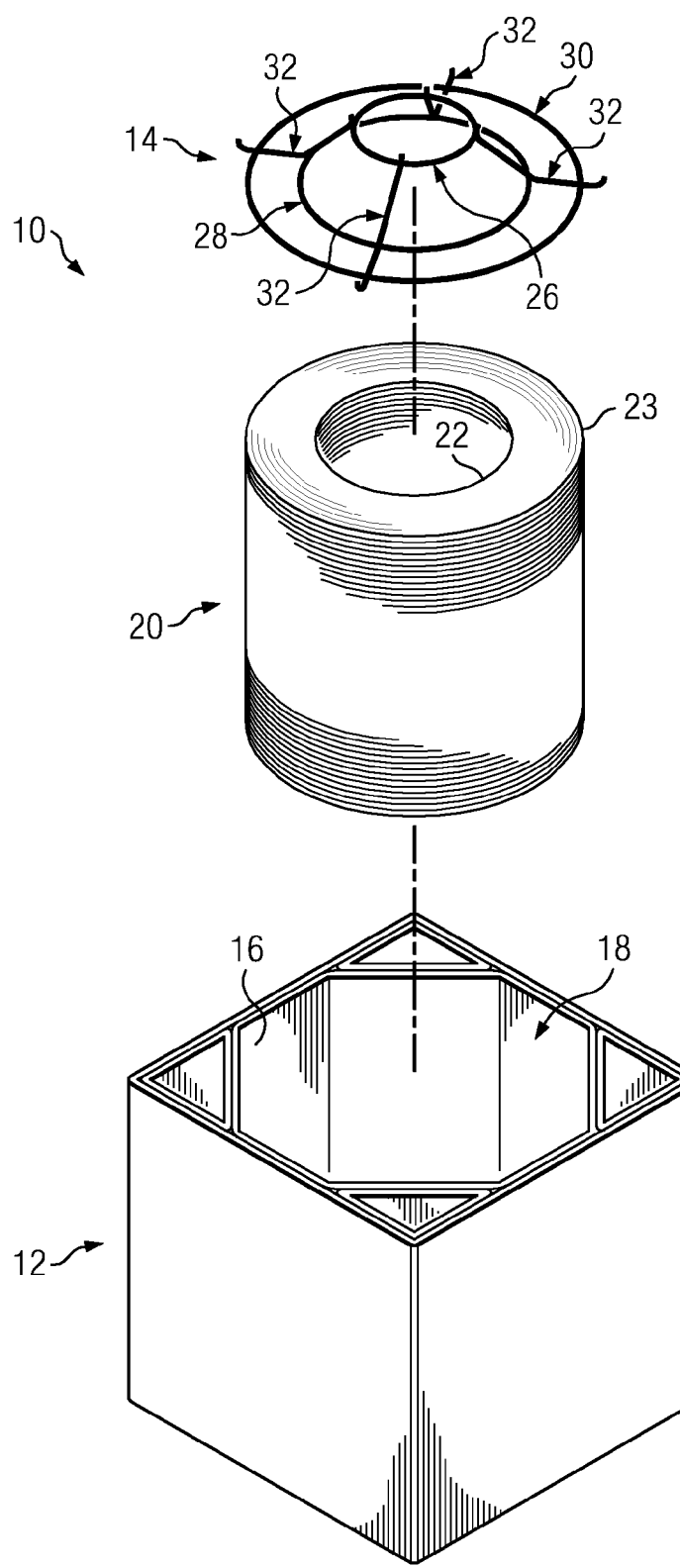
FIG. 1 is an exploded perspective view depicting a wire dispensing system, according to one embodiment.

Embodiments are hereinafter described in detail in connection with the views of FIGS. 1-5, wherein like numbers indicate the same or corresponding elements throughout the views. As illustrated in FIG. 1, a wire dispensing system 10 can include a wire container 12 and a wire payoff structure 14. The wire container 12 can include a wall 16 that defines a receptacle 18. A wire stack 20 can be disposed at least partially within the receptacle 18. The wire stack 20 can be formed from a wire strand that can be wound such that the wire stack 20 comprises a cylindrical-shaped stack. In one embodiment, as illustrated in FIG. 1, the wire strand can be wound to form a cylindrical shape that defines an inner perimeter 22 and an outer perimeter 23. The wire strand can be dispensed from the inner perimeter 22 such as for use in a welding process, for example. In some embodiments, the wire strand can be wound with a pre-twist that facilitates more effective dispensation of the wire strand from the inner perimeter. When the wire stack 20 is within the receptacle 18, the wire payoff structure 14 can be stacked on top of the wire stack 20 and the wire strand can be routed through the inner ring 26 to facilitate dispensation of the wire strand from the wire stack 20 and the wire container 12. As will be described in further detail below, the wire payoff structure 14 can prevent unraveling of the wire stack 20 during dispensation of the wire strand.

Figure 2:
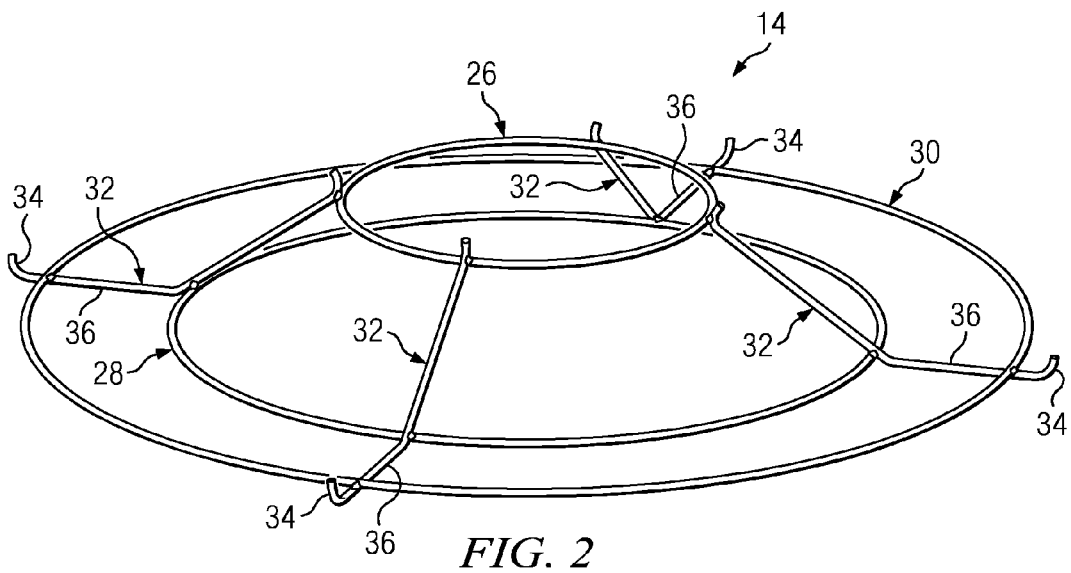
FIG. 2 is a perspective view of a wire payoff structure of the wire dispensing system of FIG. 1.

As illustrated in FIG. 2, the wire payoff structure 14 can include an inner ring 26, an intermediate ring 28, and an outer ring 30. In one embodiment, the inner ring 26 can be arranged above the intermediate ring 28. The intermediate ring 28 can be spaced radially outwardly from the inner ring 26 and the outer ring 30 can be spaced radially outwardly from the intermediate ring 28. The wire payoff structure 14 can include a plurality of arm members 32. The arm members 32 can be equally circumferentially spaced about the inner, intermediate, and outer rings 26, 28, 30, or otherwise circumferentially spaced. Arm members 32 can be attached to each of the inner ring 26, the intermediate ring 28, and the outer ring 30 such that the inner, intermediate, and outer rings 26, 28, 30 cooperate with the arm members 32 to form an inverted funnel-type configuration. The inner ring 26, the intermediate ring 28, and the outer ring 30 are shown to be concentrically arranged and with the arm members 32 extending radially outwardly from the inner ring 26 and beyond each of the intermediate ring 28 and the outer ring 30. It will be appreciated, however, that the inner ring 26, the intermediate ring 28, the outer ring 30, and the arm members 32 can be provided in any of a variety of suitable alternative arrangements. In one embodiment, each of the inner ring 26, the intermediate ring 28, the outer ring 30, and the arm members 32 can be formed from metal (e.g., steel, iron, copper) and coupled together, such as through welding, for example. In another embodiment, the inner ring 26, the intermediate ring 28, the outer ring 30, and the arm members 32 can be formed from plastic and integrally coupled together (e.g., through plastic thermoforming) so as to form a one-piece structure. In other embodiments, however, the wire payoff structure 14 can be formed from any of variety of suitable alternative materials.

As described above, the wire payoff structure 14 can be provided on top of the wire stack 20. The wire strand from the wire stack 20 can be routed through the wire payoff structure 14 (e.g., through the inner ring 26). As the wire strand is dispensed from the wire stack 20, the height of the wire stack 20 can decrease. The wire payoff structure 14 can accordingly move downwardly with the wire stack 20 (e.g., due to gravitational forces) to provide a consistent dispensing location at the top of the wire stack 20.

The plurality of arm members 32 are shown to be attached to the inner ring 26 and the intermediate ring 28 such that each of the arm members 32 overlies the inner ring 26 and the intermediate ring 28. In this configuration, when the wire strand is dispensed from the wire container 12 and through the wire payoff structure 14, the inner ring 26 and the intermediate ring 28 can facilitate effective routing of the wire strand out of the wire container 12 and without the wire strand becoming entangled with the arm members 32. In other embodiments, however, the arm members 32 can be attached to the inner ring 26 and the intermediate ring 28 such that the arm members 32 might not overlie the inner ring 26 and the intermediate ring 28. For example, each arm member can extend between an inner ring and an intermediate ring such that the arm members abut with the inner ring and the intermediate ring. In another example, arm members can underlie the inner ring 26 and the intermediate ring 28.

Figure 3:
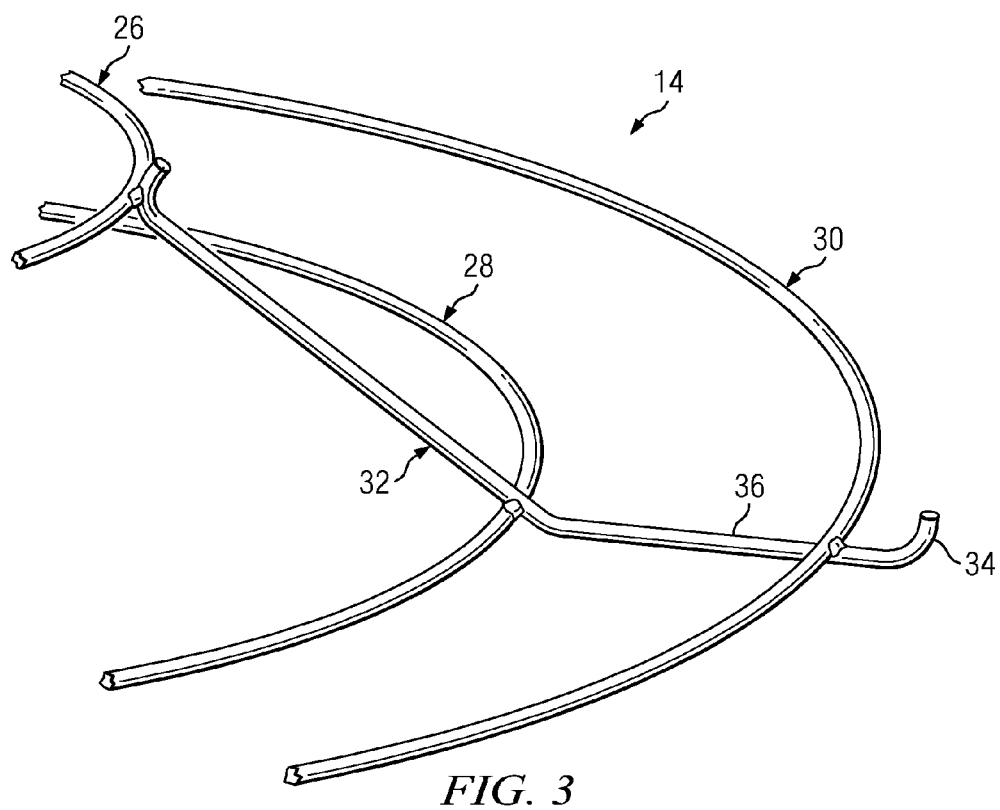
FIG. 3 is an enlarged perspective view of a portion of the wire payoff structure of FIG. 2.

As illustrated in FIGS. 2 and 3, each of the arm members 32 can extend beyond the outer ring 30 and can include an upwardly extending end portion 34. When the wire strand is dispensed from the wire container 12, the upwardly extending end portions 34 can contact the wall 16 of the wire container 12 to prevent the wire payoff structure 14 from spinning. In one embodiment, the upwardly extending end portions 34 can maintain contact with the wall of the wire container 12. In such an embodiment, the upwardly extending end portions 34 frictionally engage the wire container 12 sufficiently to keep the wire payoff structure 14 from spinning while simultaneously permitting the wire payoff structure 14 to move downwardly as the height of the wire stack 20 decreases (e.g., as the wire strand is dispensed from the wire stack 20). In another embodiment, the upwardly extending end portions 34 can selectively contact the wall of the wire container 12. In such an embodiment, the wire payoff structure 14 can be sized such that different ones of the upwardly extending end portions 34 contact the wire container 12 during dispensation of the wire strand from the wire stack 20. For example, the wire payoff structure 14 can be sized such that the wire payoff structure 14 can wobble during dispensation of the wire strand from the wire stack 20. In such an arrangement, different ones of the upwardly extending end portions 34 can continually contact the wire container 12 during dispensation (e.g., to allow the wire payoff structure 14 to wobble without spinning).

In an alternative embodiment, the wall 16 of the wire container 12 can define a plurality of recesses that are configured to receive the upwardly extending end portions 34. The plurality of recesses can be arranged in columns and each column of recesses can be aligned with one of the upwardly extending end portions 34. As the height of the wire stack 20 decreases. each upwardly extending end portion 34 can selectively engage lower ones of the respective recesses to prevent the wire payoff structure 14 from being inadvertently separated from the wire stack 20. It will be appreciated that the wire payoff structure can include any of a variety of suitable alternative means for engaging a wall of a wire container. In yet another alternative embodiment, the upwardly extending portions 34 can prevent the wire payoff structure 14 from spinning without contacting the wall 16 of the wire container 12.

Figure 4:
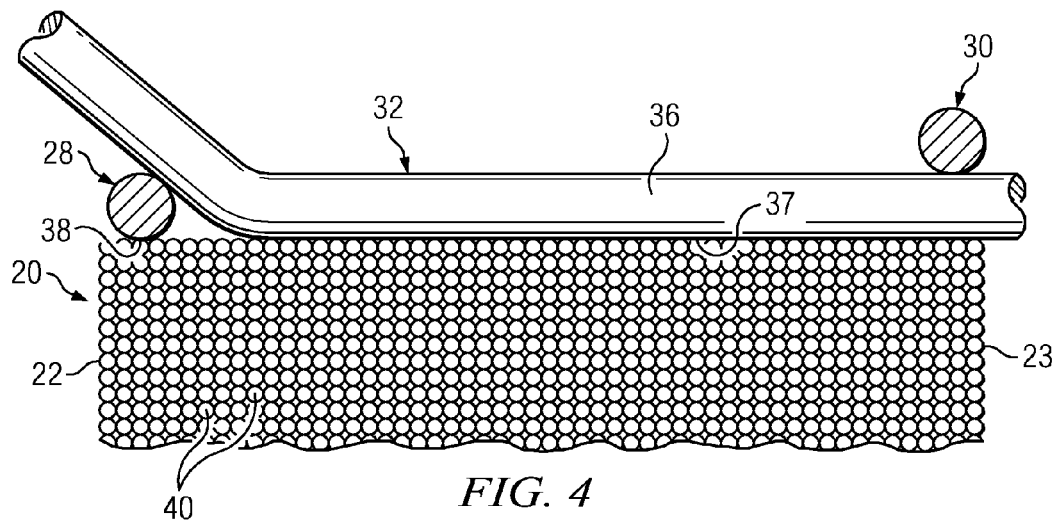
FIG. 4 is a cross-sectional view of a portion of the wire payoff structure of FIG. 2 provided on top of a wire stack.

As illustrated in FIGS. 2-4, the arm members 32 can include a lower extending portion 36. The lower extending portion 36 can pass beneath the outer ring 30 to prevent the wire stack 20 from unraveling. For example, as illustrated in FIGS. 3 and 4, the arm member 32 can be attached to the intermediate ring 28 such that the lower extending portion 36 is adjacent to the intermediate ring 28. The lower extending portion 36 can define a bottom surface 37 and the intermediate ring 28 can define a bottom surface 38. In one embodiment, as shown in FIG. 4, the respective bottom surfaces 37, 38 of the lower extending portion 36 and the intermediate ring 28 can be substantially coplanar to facilitate direct contact with the wire stack 20.

The wire payoff structure 14 can be provided on top of the wire stack 20 such that the intermediate ring 28 is substantially aligned with the inner perimeter 22 of the wire stack 20. With the wire payoff structure 14 in this arrangement, the lower extending portion 36 can extend transverse to the wound wire strand (e.g., 40 in FIG. 4) between the inner perimeter 22 and the outer perimeter 23. The respective bottom surfaces 37. 38 of the lower extending portion 36 and the intermediate ring 28 can directly contact the wire stack 20 and the weight of the wire payoff structure 14 can be distributed across the top of the wire stack 20 (e.g., between the inner perimeter 22 and the outer perimeter 23) via each of the lower extending portions 36: During dispensation of the wire strand (e.g., 40) from the wire container 12, the lower extending portions 36 of the wire payoff structure 14 directly contact the top of the wire stack 20 to prevent the wire stack 20 from unraveling and without impeding the dispensation of the wire strand.

The direct contact between the wire payoff structure 14 and the wire stack 20 can alleviate the need for an intermediate structure for use in conjunction with conventional wire payoff structures. For example, sonic conventional wire payoff structures can include radial arms that pass above an outer ring such that the outer ring underlies the radial arms. When these wire payoff structures are provided on top of a wire stack, the outer ring contacts the outer perimeter of the wire stack while the radial arms are angled away from the stack (e.g., resulting in a space between the wire stack and the radial arms). These conventional wire payoff structures are thus ineffective to prevent a wire strand from unraveling when provided in direct contact with a top of a wire stack. An intermediate structure is therefore provided vertically between the conventional wire payoff structure and the wire stack. The intermediate structure rests upon the wire stack (e.g., directly contacting the wire stack) and extends between the inner and outer perimeters. The intermediate structure distributes the weight of the conventional wire payoff structure between the inner and outer perimeters of the wire stack and compensates for the inability of the conventional wire payoff structure alone to prevent the wire stack from unraveling. Typically, the intermediate structure comprises a flat cardboard ring. However, it will be appreciated that intermediate structures can be any of a variety of suitable shapes formed from any of a variety of materials, such as fiberboard, wood, paper, or plastic, for example.

Since the lower extending portions 36 of the arm members 32 are configured to rest upon the wire stack 20 to provide even weight distribution, the wire payoff structure 14 can prevent unraveling without the use of an intermediate structure and can thus be more cost effective and easier to employ in a wire dispensing system than a conventional wire payoff structure and an associated intermediate structure. Manufacturing costs are oftentimes affected by the amount of waste material that requires disposal (e.g., a waste stream). The wire payoff structure 14 can be formed from a material (e.g., steel) that conforms to a facility's existing waste stream to reduce the burden of the wire payoff structure on a facility's waste stream costs. Moreover, by omitting the reliance on an intermediate structure, certain waste streams at a facility may be further reduced, and in some cases, even eliminated.

Figure 5:
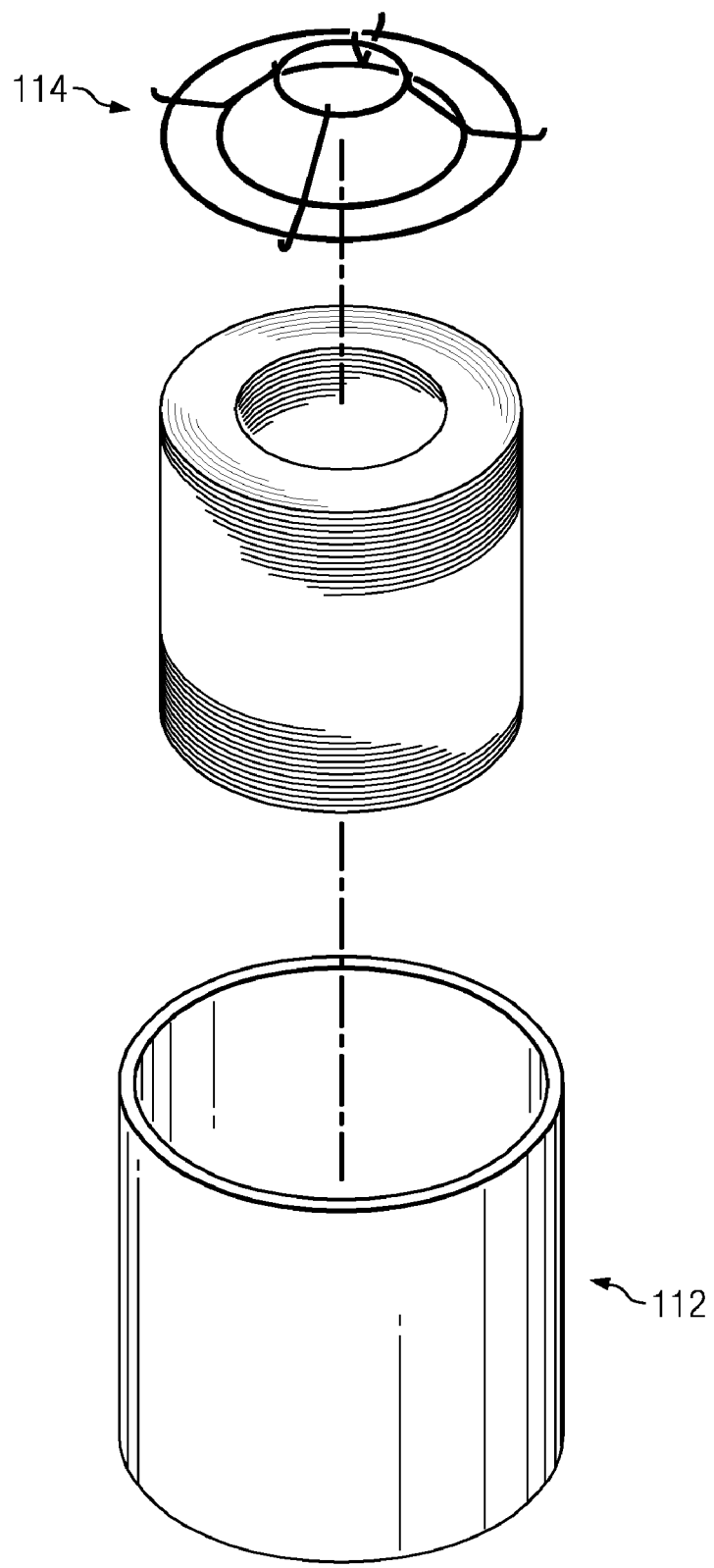
FIG. 5 is an exploded perspective view depicting a wire dispensing system, according to another embodiment.

Although the wire container 12 is shown to be a box-shaped container, it will be appreciated that the wire payoff structure 14 can be employed with any of a variety of suitable wire container configurations. For example, as illustrated in FIG. 5, a wire payoff structure 114. that is similar in many respects to wire payoff structure 14, can be employed with a wire drum 112. It will also be appreciated that a lower extending portion of an arm member can extend beneath an outer ring in any of a variety of suitable alternative arrangements. For example, a lower extending portion can be coupled with the intermediate ring with a bottom surface of the lower extending portion disposed beneath the intermediate ring such that the wire stack contacts only the lower extending portion (e.g., the intermediate ring overlying the arm members).

Although the embodiments above have been described with respect to three rings and four arm members, it will be appreciated that in other embodiments a wire dispensing assembly can include more or less than three rings and/or more or less than four arm members. While various embodiments of a wire dispensing assembly have been illustrated by the foregoing description and have been described in detail with respect to FIGS. 1-5. it is not intended to be exhaustive or to limit the scope of the appended claims to such detail. Numerous modifications are possible in light or the above teachings. Some of those modifications have been discussed and others will be understood by those skilled in the art.

What is claimed is:

1. A wire payoff structure comprising:
 a plurality of arm members;
 a first ring coupled with each of the arm members;
 a second ring coupled with each of the arm members and spaced radially outwardly from the first ring; and
 a third ring coupled with each of the arm members and spaced radially outwardly from the second ring;
 wherein a portion of each arm member passes beneath the third ring to facilitate contact with an underlying wire stack, the second ring defines a first bottom surface, the plurality of arm members define a second bottom surface, and the first bottom surface and the second bottom surface are substantially coplanar.

2. The wire payoff structure of claim 1 wherein each arm member overlies the first ring and the second ring.

3. The wire payoff structure of claim 1 wherein each arm member comprises an end portion that extends radially outwardly past the third ring to facilitate engagement with a wire stack container.

4. The wire payoff structure of claim 3 wherein each end portion of each arm member comprises an upwardly extending member.

5. The wire payoff structure of claim 1 wherein the first ring, the second ring, and the third ring are concentrically arranged.

6. The wire payoff structure of claim 5 wherein the plurality of arm members extend radially outwardly from the first ring and beyond each of the second ring and the third ring.

7. The wire payoff structure of claim 1 wherein the first ring is arranged above the second ring.

8. A wire dispensing system comprising:
 a wire stack container comprising a wall, the wall defining a receptacle; and
 a wire payoff structure comprising:
  a plurality of arm members, each arm member comprising an end portion;
  a first ring coupled with each of the arm members;
  a second ring coupled with each of the arm members and spaced radially outwardly from the first ring; and
  a third ring coupled with each of the arm members and spaced radially outwardly from the second ring;
  wherein a portion of each arm member is interposed between the third ring and a wire stack, a portion of each arm member contacts a wire stack, and the end portion of each arm extends radially outwardly past the third ring for contact with the wall.

9. The wire dispensing system of claim 8 wherein a wire stack defines an inner perimeter and the second ring is substantially aligned with the inner perimeter.

10. The wire dispensing system of claim 8 wherein the first ring is configured to receive a wire strand from a wire stack to facilitate dispensation of the wire strand from the receptacle.

11. The wire dispensing system of claim 8 wherein each arm member overlies the first ring and the second ring.

12. The wire dispensing system of claim 11 wherein the end portion of each arm member comprises an upwardly extending member.

13. The wire dispensing system of claim 8 wherein the first ring, the second ring, and the third ring are concentrically arranged.

14. The wire dispensing system of claim 8 wherein each arm member extends radially outwardly from the first ring and beyond the second ring and the third ring.

15. The wire dispensing system of claim 8 wherein each arm member facilitates direct contact with a wire stack.

16. An apparatus comprising:
 a wire stack container comprising a wall, the wall defining a receptacle;
 a wire stack comprising a wire strand; and
 a wire payoff structure comprising:
  a plurality of arm members;
  a means for facilitating contact with the wall of the wire stack container;
  a first ring coupled with each of the arm members;
  a second ring coupled with each of the arm members and spaced radially outwardly from the first ring; and
  a third ring coupled with each of the arm members and spaced radially outwardly from the second ring;
  wherein a portion of each arm member is interposed between the third ring and the wire stack, and a portion of each arm member contacts the wire stack.

17. The apparatus of claim 16 wherein the second ring defines a first bottom surface, the plurality of arm members define a second bottom surface, and the first bottom surface and the second bottom surface are substantially coplanar.

18. The apparatus of claim 17 wherein the arm members directly contact the wire stack.

* * * * *

UNITED STATES PATENT AND TRADEMARK OFFICE
CERTIFICATE OF CORRECTION

PATENT NO. : 8,313,054 B2  
APPLICATION NO. : 12/696612  
DATED : November 20, 2012  
INVENTOR(S) : Michael Carroscia et al.

Page 1 of 1

It is certified that error appears in the above-identified patent and that said Letters Patent is hereby corrected as shown below:

Column 2, line 10, change "26." to --26,--;
Column 2, line 18, change "26. 28." to --26, 28,--;
Column 2, line 20, change "26." to --26,--;
Column 2, line 21, change "inner." to --inner,--;
Column 2, line 27-28, change "appreciated." to --appreciated,--;
Column 2, line 29, change "30." to --30,--;
Column 2, line 39, change "however." to --however,--;
Column 3, line 34, change "decreases." to --decreases,--;
Column 3, line 64, change "37." to --37,--;
Column 4, line 2, change "36:" to --36.--;
Column 4, line 11, change "sonic" to --some--;
Column 4, line 54, change "114." to --114,--;
Column 5, line 5, change "1-5." to --1-5,--; and
Column 5, line 7, change "or" to --of--.

Signed and Sealed this
Second Day of April, 2013

Teresa Stanek Rea
*Acting Director of the United States Patent and Trademark Office*